Patented Apr. 1, 1930

1,752,617

UNITED STATES PATENT OFFICE

WERNER SCHULEMANN, OF VOHWINKEL, NEAR ELBERFELD, AND FRITZ SCHÖNHÖFER AND AUGUST WINGLER, OF ELBERFELD, GERMANY, ASSIGNORS TO WINTHROP CHEMICAL COMPANY, INC., OF NEW YORK, N. Y., A CORPORATION OF NEW YORK

PROCESS FOR THE AMINOALKYLATION OF AMINES

No Drawing. Application filed January 12, 1928, Serial No. 246,382, and in Germany January 25, 1927.

The present invention concerns a process for the amino-alkylation of amines or of their substitution products by treating them with compounds of the general formula $x.R_1$ in the form of their salts, wherein $x$ represents halogen or the residue of an aromatic sulfonic acid and $R_1$ the residue of an amine, with or without the addition of an agent combining with the acid and in the presence or absence of a solvent.

It is already known that the free halogenides of the amino alcohols on reaction with amines yield the corresponding amino-alkyl derivatives. A considerable number of such halogenides are however unstable on account of their easy conversion into quaternary compounds or on account of other intermediate reactions, so that the yields obtainable by following this process are usually very bad. In some individual cases, the formation of quaternary salts takes place so readily, that practically no interaction can be effected with the amines.

In accordance with this invention the salts of the free halogenides are employed. When caused to react in this manner, even the most sensitive amino-alkyl-halogenides give excellent yields of the alkylated products. Moreover the process has the advantage that the isolation of the free halogenides, which is often very difficult, is avoided and the salts obtained from the halogenation of the amino alcohols can be obtained ready for immediate use.

The salts of the sulfonic acid esters of the amino-alcohols behave in a similar manner to the salts of the halogenides. The alkylation can be effected by melting the salts of the halogenides or their sulfonic acid esters with the amine with or without the addition of an agent for combining with the acid or also by heating the components in a suitable solvent.

The application of our new process offers in a large number of cases the only possibility at present known of obtaining the desired amino-alkyl derivatives.

The following examples will illustrate the principles underlying our invention.

*Example 1*

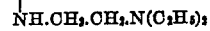

260 grams of aniline are heated with 171 grams of diethylamino-ethyl-chloride-hydrochloride for 8 to 10 hours at 100–110° C. The melt is taken up in water, rendered alkaline with potassium carbonate, and the free base is dissolved in a little ether or benzene. After drying over the potassium carbonate the liquid is subjected to fractional distillation for the separation of the excess of aniline, and the mono-alkylated base is obtained as a colorless oil of the boiling point 121 to 122° C. under 5 mm. pressure.

*Example 2*

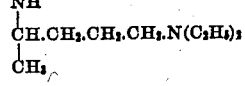

130 grams of aniline are boiled under reflux with 303 grams of α-diethyl-amino-δ-bromopentane-hydro-bromide in 200 ccm. of alcohol with the addition of 136 grams of crystalline sodium acetate for 6 to 8 hours. After distilling off the alcohol the working up is effected in the manner described in Example 1. The base boils as a colorless liquid at 150 to 154° C. under 6 mm. pressure. The product is obtained in the same manner by the use of 349 grams of the hydrochloride of the p-toluene-sulfonic-acid-ester of α-diethyl-amino-δ-pentanol instead of the bromide.

*Example 3*

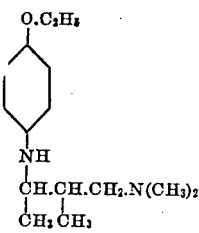

274 grams of p-phenetidine are heated with 186 parts by weight of α-dimethylamino-β-methyl-γ-chloro-butane-hydrochloride for 12 hours at 120 to 130° C. The working up is effected as described in Example 1. The base, a colorless oil, boils at 162 to 164° C. under 5 mm. pressure.

*Example 4*

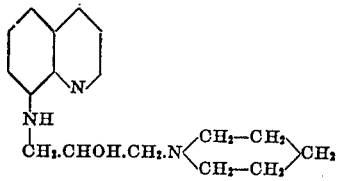

144 grams of 8-amino-quinoline are melted with 214 grams of α-piperidyl-β-hydroxy-γ-chloro-propane-hydrochloride for 8 hours at 120 to 130° C. The working up is effected as described in Example 1. The base, a light yellow oil, boils at 212 to 213° C. under 1 mm. pressure.

*Example 5*

117 grams of diethylamino-ethyl-alcohol, dissolved in 500 grams of benzene, are mixed together with 190.5 grams of p-toluene-sulfo-chloride, dissolved in benzene, the mixture being slowly heated to boiling. After the reaction has finished, the benzene is distilled off and the residue is heated with 186 grams of aniline at 100–130° C. for 8–10 hours while stirring; the reaction mass is dissolved in diluted hydrochloric acid, and the excess of aniline is made free by the addition of sodium acetate and distilled off with water steam. The residue is rendered alkaline with caustic soda solution and the free base is extracted strongly with ether. After drying over potassium carbonate, the ether is distilled off. The N-diethyl-amino-ethyl-aniline is obtained as a colorless oil of the boiling point 121 to 122° C. under 5 mm. pressure.

This is a continuation-in-part of our applications Ser. No. 52,228, filed August 24, 1925, Ser. No. 52,229, filed August 24, 1925 and Ser. No. 52,230, filed August 24, 1925 which has matured into Patent Number 1,747,531, dated Feb. 18, 1930.

We claim:

1. In the process for the amino-alkylation of amines the step which comprises treating a primary aromatic amine with a compound of the general formula: $x.R_1$ in the form of its salts wherein $x$ represents halogen or the residue of an aromatic sulfonic acid and $R_1$ the residue of a tertiary amine.

2. In the process for the amino-alkylation of amines the step which comprises treating a primary aromatic amine with a compound of the general formula: $x.R_1$ in the form of its salts wherein $x$ represents halogen or the residue of an aromatic sulfonic acid and $R_1$ the residue of a tertiary amine with the addition of a solvent.

3. In the process for the amino-alkylation of amines the step which comprises treating a primary aromatic amine with a compound of the general formula: $x.R_1$ in the form of its salts wherein $x$ represents halogen or the residue of an aromatic sulfonic acid and $R_1$ the residue of a tertiary amine with the addition of an agent for combining the liberated acid.

4. In the process for the amino-alkylation of amines the step which comprises treating a primary aromatic amine with a compound of the general formula: $x.R_1$ in the form of its salts wherein $x$ represents halogen or the residue of an aromatic sulfonic acid and $R_1$ the residue of a tertiary amine with the addition of an agent for combining the liberated acid and a solvent.

5. In the process for the amino-alkylation of amines the step which comprises treating a primary aromatic amine with a compound of the general formula: $x.R_1$ in the form of its salts wherein $x$ represents halogen and $R_1$ a dialkylamino-alkyl residue.

6. In the process for the amino-alkylation of amines the step which comprises treating a primary aromatic amine with a compound of the general formula: $x.R_1$ in the form of its hydrochloride wherein $x$ represents chlorine, and $R_1$ a dialkyl-amino-alkyl residue.

7. In the process for the amino-alkylation of aniline the step which comprises treating aniline with diethylamino-ethyl-chloride-hydro-chloride at a temperature of 100–110° C. for 8 to 10 hours.

In testimony whereof we have hereunto set our hands.

WERNER SCHULEMANN.
FRITZ SCHÖNHÖFER.
AUGUST WINGLER.